United States Patent
Johnas

(10) Patent No.: US 6,764,138 B1
(45) Date of Patent: Jul. 20, 2004

(54) AUTOMATIC ACTUATING BAFFLE FOR A DUMP BOX

(76) Inventor: David A. Johnas, N4608 Martin Dr., Medford, WI (US) 54451

( * ) Notice: Subject to any disclaimer, the term of this patent is extended or adjusted under 35 U.S.C. 154(b) by 0 days.

(21) Appl. No.: 10/373,278

(22) Filed: Feb. 24, 2003

Related U.S. Application Data

(60) Provisional application No. 60/361,386, filed on Feb. 28, 2002.

(51) Int. Cl.$^7$ ............................... B60R 1/00; B60P 1/04
(52) U.S. Cl. ..................................................... 298/1 B
(58) Field of Search ....................... 298/1 B, 7, 183.2; 414/519, 414

(56) References Cited

U.S. PATENT DOCUMENTS

| | | | | |
|---|---|---|---|---|
| RE6,783 E | * | 12/1875 | Hamilton | 298/7 |
| 1,815,653 A | * | 7/1931 | Jones | 298/22 R |
| 2,471,874 A | * | 5/1949 | Johns | 298/26 |
| 2,878,053 A | * | 3/1959 | Yuncker | 296/15 |
| 3,024,932 A | * | 3/1962 | Dodgen | 414/489 |
| 5,437,499 A | * | 8/1995 | Musso | 298/26 |
| 5,456,521 A | * | 10/1995 | Moyna | 298/1 B |
| 5,599,071 A | * | 2/1997 | Kann et al. | 298/23 R |
| 5,716,103 A | * | 2/1998 | Kann et al. | 298/25 |

\* cited by examiner

*Primary Examiner*—D. Glenn Dayoan
*Assistant Examiner*—H. Gutman
(74) *Attorney, Agent, or Firm*—Donald J. Ersler

(57) ABSTRACT

An automatic actuated baffle for a dump box includes a baffle, a first actuating link, a second actuating link, and an actuation device. One end of the baffle is pivotally attached to a side wall of the dump box and the other end of the baffle is pivotally attached to one end of the first actuating link. The other end of the first actuating link is pivotally attached to one end of the second actuating link. The other end of the second actuating link is pivotally attached to the side wall of the dump box. Retraction of a fully extended actuation end of the actuation device causes the second actuating link to pivot, which causes the baffle to extend outward from the side wall of the dump box.

17 Claims, 7 Drawing Sheets

AUTOMATIC ACTUATING BAFFLE FOR A DUMP BOX

BACKGROUND OF THE INVENTION

1. Cross-References to Related Applications

This is a utility application, taking priority from provisional patent application, Ser. No. 60/361,386 filed on Feb. 28, 2002.

2. Field of the Invention

The present invention relates generally to dump boxes and more specifically to an automatic actuating baffle for a dump box, which may be moved without physical labor.

3. Discussion of the Prior Art

Baffles are used in dump boxes to decrease the width of the path for materials poured out of the dump box. It appears: there are no commercially available baffles which may be automatically operated. A manually actuated baffle requires the operator to spend extra time to get out of the truck cab and physically set the baffle.

Accordingly, there is a clearly felt need in the art for an automatic actuated baffle for a dump box, which may be moved without physical labor.

SUMMARY OF THE INVENTION

The present invention provides an automatic actuated baffle for a dump box, which does not require physical labor to set. The automatic actuated baffle for a dump box includes a baffle, a first actuating link, a second actuating link, and an actuation device. A pair of automatic actuated baffles are preferably installed in a dump box. One end of the baffle is pivotally attached to a side wall of the dump box and the other end of the baffle is pivotally attached to one end of the first actuating link. The other end of the first actuating link is pivotally attached to one end of the second actuating link. Preferably, one end of a drive link is rigidly attached to the other end of the second actuating link.

The other end of the second actuating link is pivotally attached to the side wall of the dump box. An opening is formed through the side wall of the dump box to provide clearance for the drive link. The other end of the drive link is pivotally retained by an actuation end of an actuation device. The actuation end of the actuation device is in a fully extended position when the other end of the baffle is against the dump box wall. The actuation device is preferably an air operated actuation device, but: other actuation devices may also be used. The nonactuating end of the actuation device is pivotally attached to the side wall.

The automatic actuated baffle for a dump box preferably operates in the following manner. To move the other end of the baffle away from the side wall of the dump box, the actuation end of the actuation device is retracted. As the actuation end retracts, the drive link rotates relative to the side wall of the dump box. The second actuating link pivots out from the side wall of the dump box and pushes the first actuation link out, which causes the other end of the baffle to move away from the side wall of the dump box. The baffle will cause material in the dump box to be poured over a narrower width. However, the position of each baffle should be adjusted before the material is placed in the dump box as would be true for a manually actuated baffle.

Accordingly, it is an object of the present invention to provide an automatic actuated baffle for a dump box which may be moved without physical labor.

These and additional objects, advantages, features and benefits of the present invention will become apparent from the following specification.

DETAILED DESCRIPTION OF THE PREFERRED EMBODIMENTS

Figure 1:
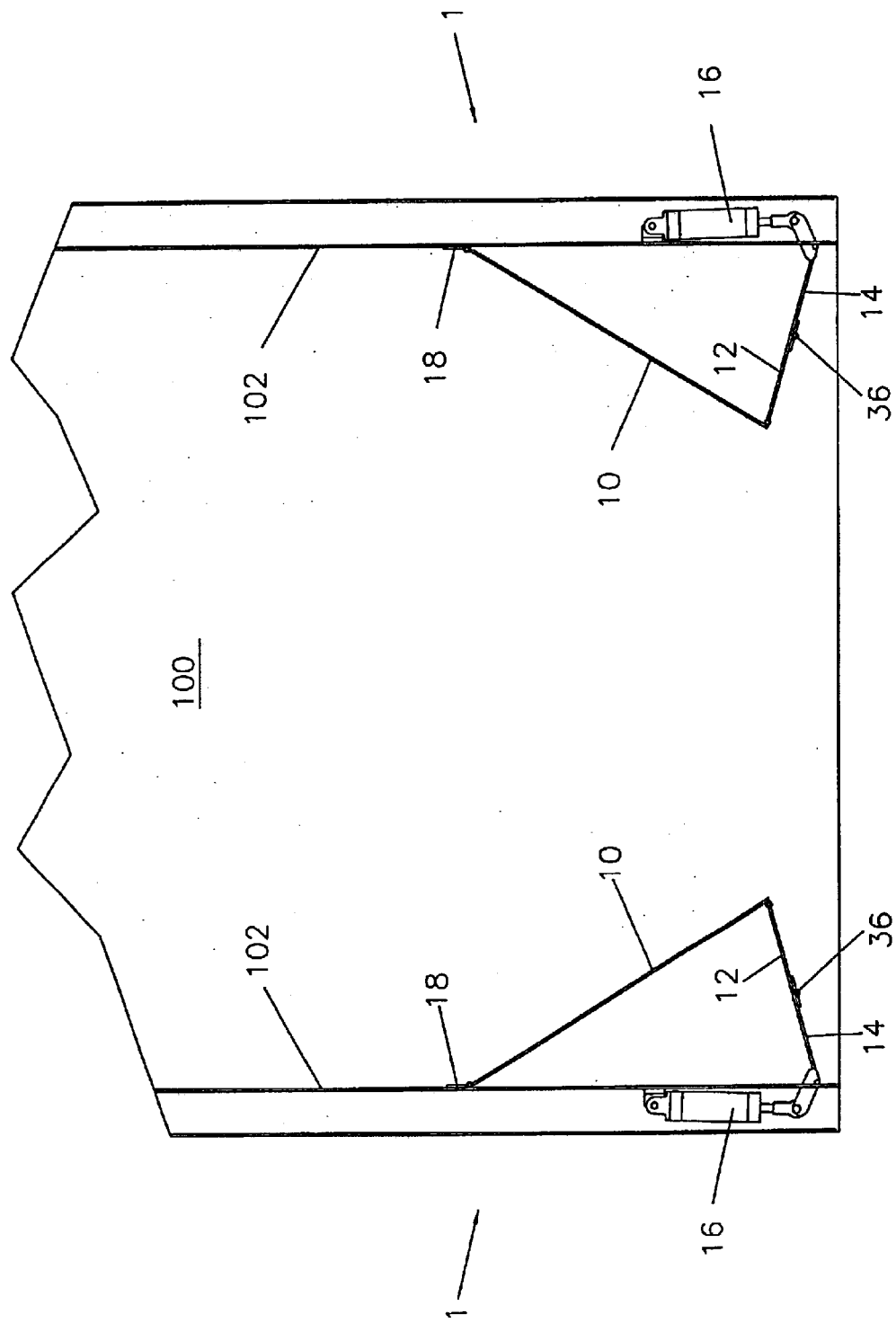
FIG. 1 is a partial top view of a dump box with a pair of automatic actuated baffles in a fully extended position in accordance with the present invention.
Figure 2:
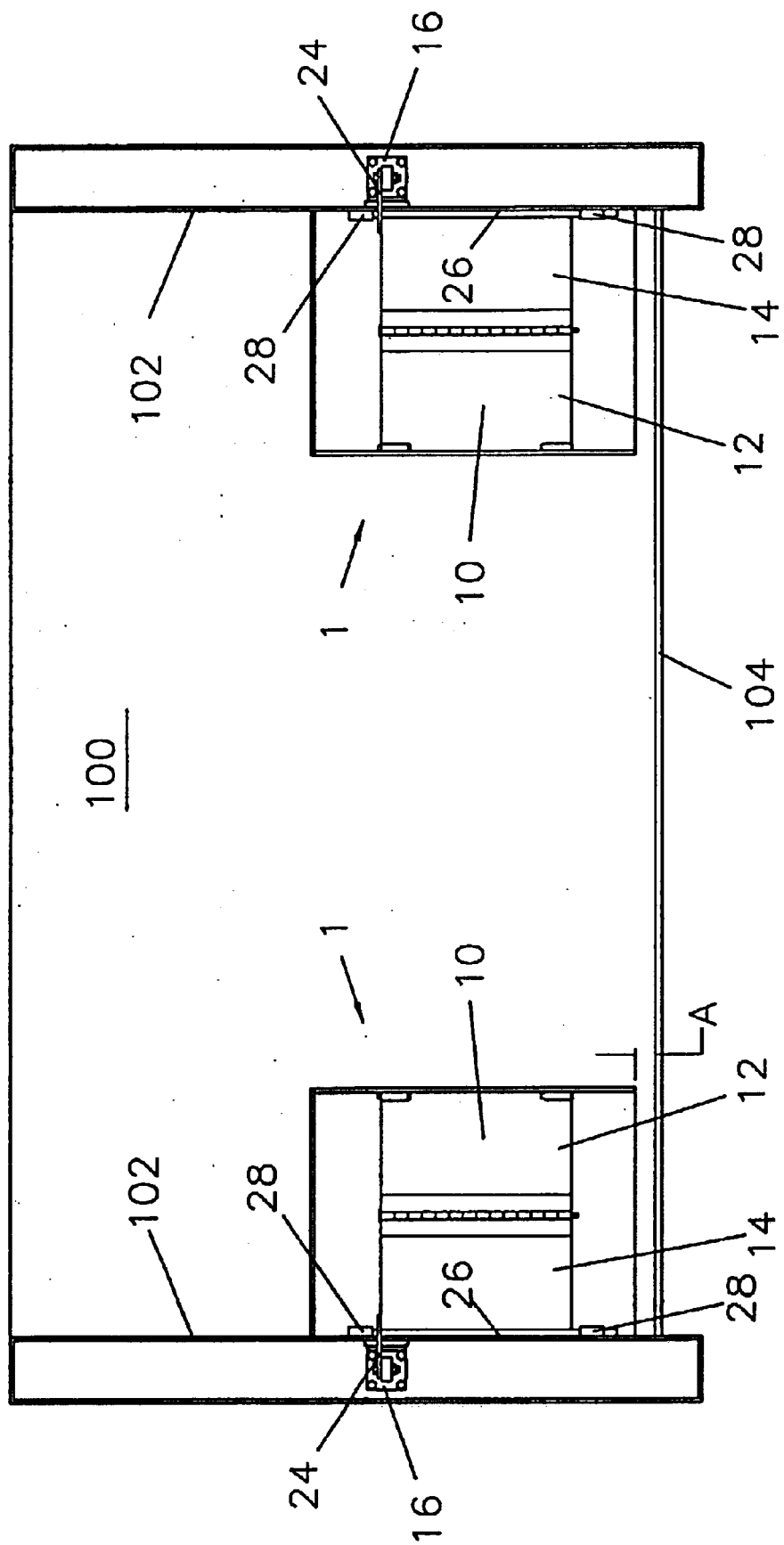
FIG. 2 is an end view of a dump box with a pair of automatic actuated baffles in a fully extended position in accordance with the present invention.
Figure 3:
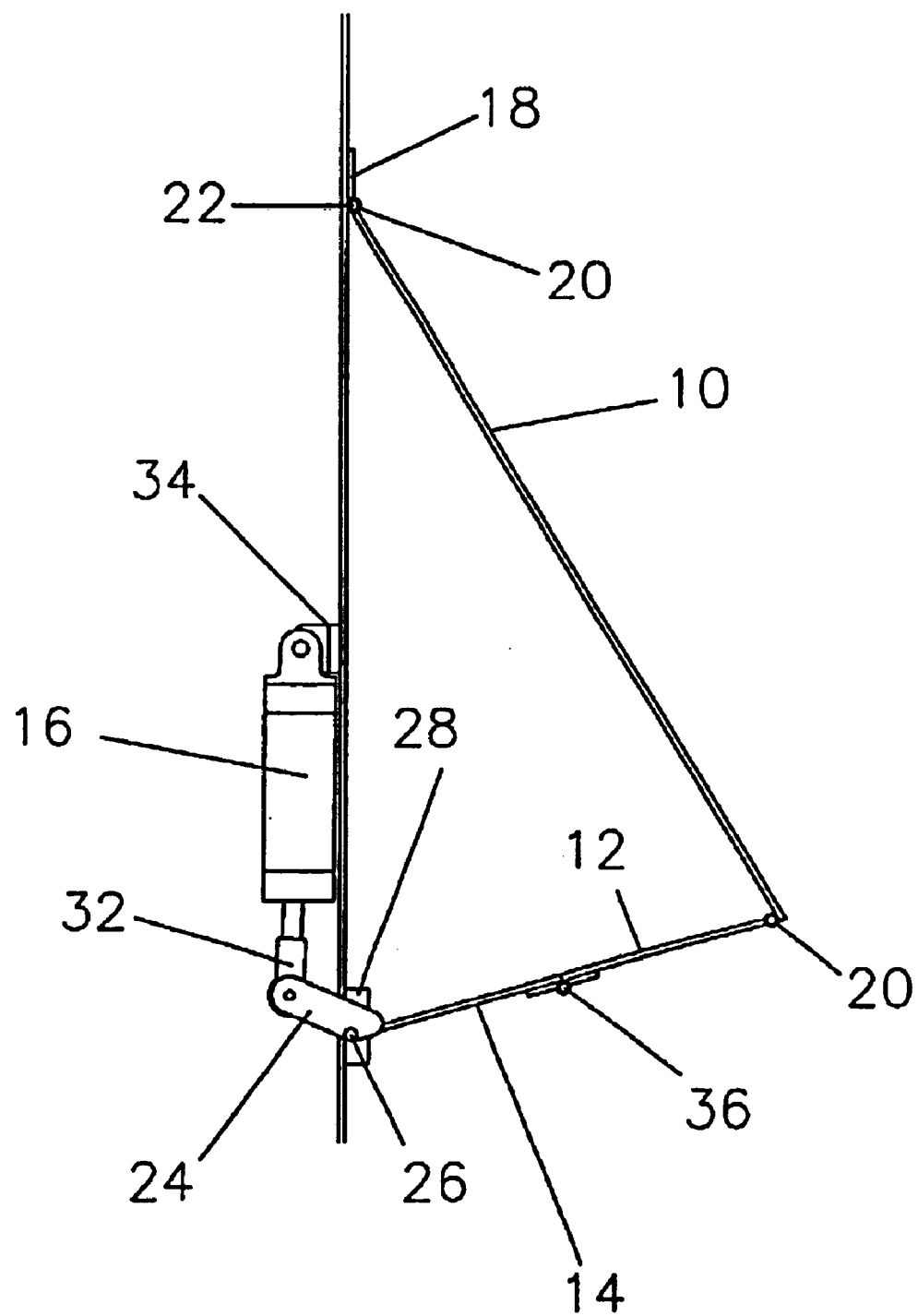
FIG. 3 is a top view of an automatic actuated baffle for a dump box in a fully extended position in accordance with the present invention.

With reference now to the drawings, and particularly to FIG. 3, there is shown a top view of an automatic actuated baffle for a dump box (automatic actuated baffle) 1. With reference to FIGS. 1 and 2, the automatic actuated baffle 1 includes a baffle 10, a first actuating link 12, a second actuating link 14, and an actuation device 16. Preferably, a pair of automatic actuated baffles 1 are installed in a dump box 100. One end of the baffle 10 is pivotally attached to a side wall 102 of the dump box 100, preferably with a hinge plate 18, but other pivotal attachment methods may also be used. One end of the hinge plate 18 is rigidly attached to the side wall 102 and the other end is pivotally attached to the one end of the baffle 10. A dimension "A" defines the distance between a bottom wall 104 of the dump box 100.and a bottom of each baffle 10. Preferably, dimension "A" has a value of at least one half of an inch. The baffle 10 preferably has a height which is half the height of the side wall 102, but other heights may also be used.

Figure 7:
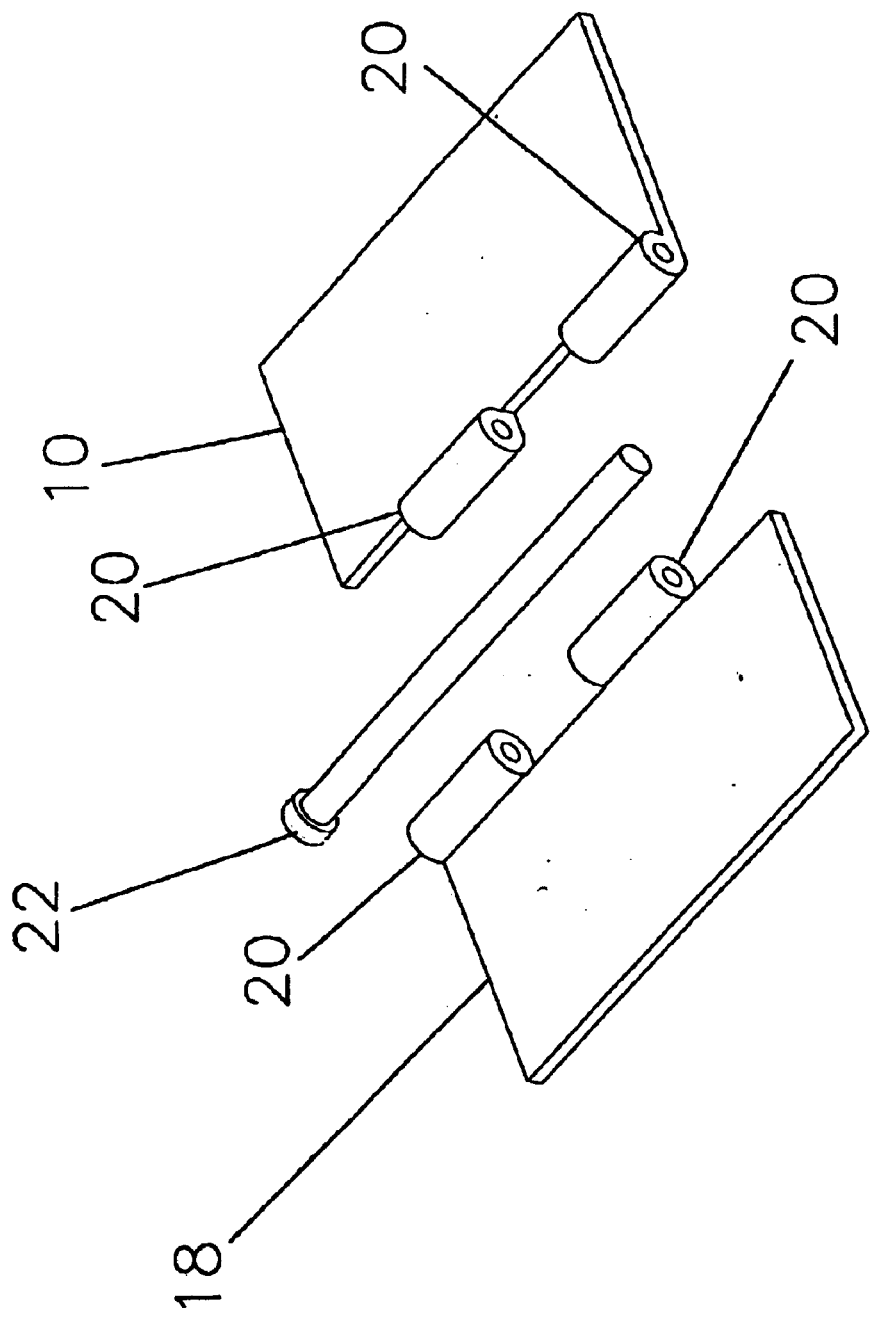
FIG. 7 is an exploded perspective view of a preferred method of pivoting an end of an actuating link or baffle of an automatic actuated baffle for a dump box in accordance with the present invention.

The pivotal relationships between the baffles, actuating links, and hinge plate are preferably similar to a hinge. With reference to FIG. 7, at least two tubular elements 20 are formed or attached to the ends of the baffle 10 and the hinge plate 18 such that they mesh with each other. A pivot pin 22 is inserted through the at least two tubular elements 20 to retain a pivotal relationship between the baffle 10 and the hinge plate 18. The other end of the baffle 10 is pivotally attached to one end of the first actuating link 12. The other end of the first actuating link 12 is pivotally attached to one end of the second actuating link 14 with a hinge 36.

Preferably, one end of the drive link 24 is rigidly attached to the other end of the second actuating link 14 with welding, but other attachment methods may also be used. The drive link 24 and the second actuating link 14 may also be formed from a single piece of material. The other end of the second actuating link 14 is pivotally attached to the side wall 102 of the dump box 100, preferably with a pivot rod 26 and at least one pivot block 28, but other pivotal attachment methods may also be used. If utilizing the pivot rod 26 and the at least one pivot block 28; the other end of the second actuating link 14 is rigidly attached to the pivot rod 26. At least one pivot block 28 is attached to the side wall 102 of the dump box; the at least one pivot block 28 pivotally retains the pivot rod 26.

Figure 6:
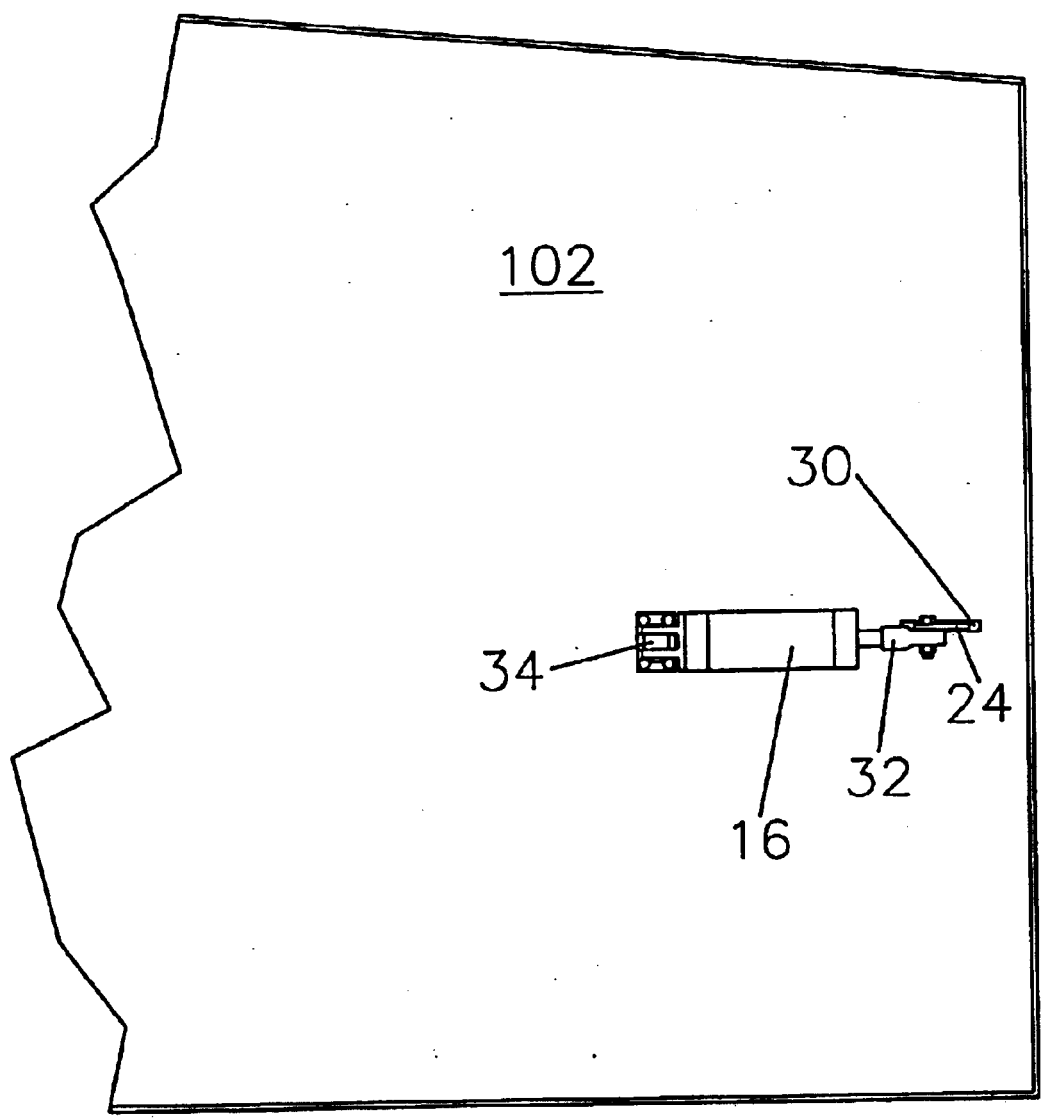
FIG. 6 is a front view of an actuation device mounted to a side wall of a dump box of an automatic actuated baffle for a dump box in accordance with the present invention.

With reference to FIG. 6, an opening 30 is formed through the side wall 102 of the dump box 100 to provide clearance for the drive link 24. The other end of the drive link 24 is pivotally retained by an actuating end 32 of the actuation device 16. A nonactuating end of the actuation device 16 is pivotally attached to the side wall 102 with an actuating pivot block 34.

Figure 4:
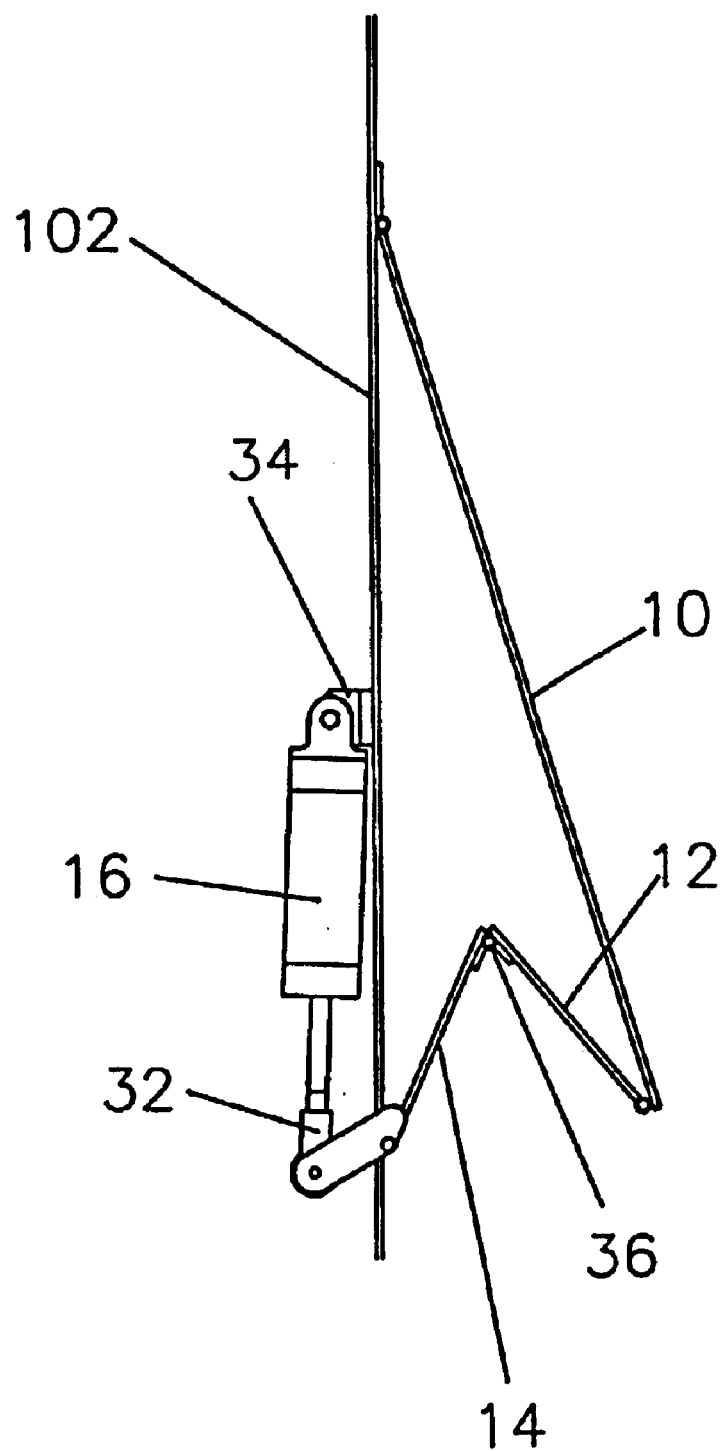
FIG. 4 is a top view of an automatic actuated baffle for a dump box in a partially extended position in accordance with the present invention.
Figure 5:
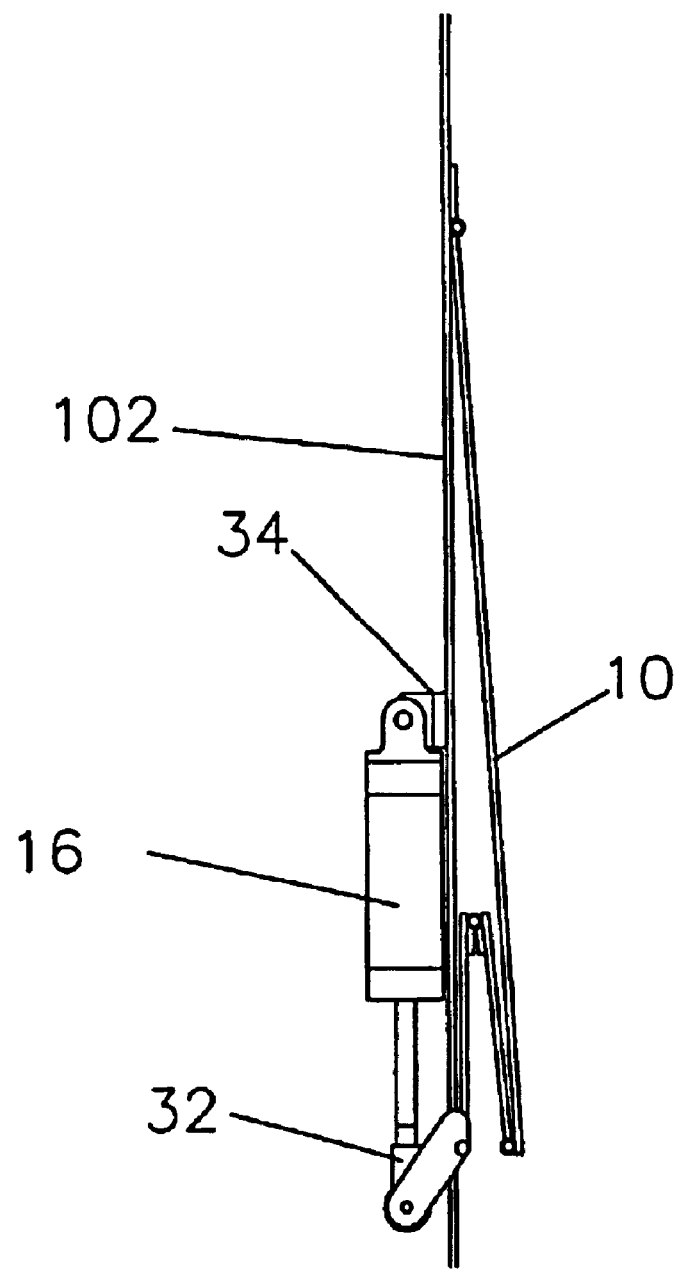
FIG. 5 is a top view of an automatic actuated baffle for a dump box in a fully retracted position in accordance with the present invention.

With reference to FIG. 5, the actuating end 32 of the actuation device 16 is in a fully extended position when the other end of the baffle 10 is against the side wall 102. With reference to FIG. 4, the actuation end 32 of the actuation device 16 is partially retracted which causes the baffle 10 to be partially extended. FIG. 3 shows the actuation end 32 of the actuation device 16 fully retracted, with the baffle 10 fully extended. The actuation device 16 is preferably an air operated actuation device such as an air cylinder. However, other types of actuation devices may also be used. It is preferably to use pressurized air, because thereof may be obtained by tapping the pressurized air system on the truck. The air flow to the air operated actuation device could be implemented with a simple on-off flow valve.

The automatic actuated baffle for a dump box 1 preferably operates in the following manner. To move the other end of the baffle 10 away from the side wall 102 of the dump box 100, the actuation end 32 of the actuation device 16 is retracted. As the actuation end 32 retracts, the drive link 24 pivots relative to the side wall 102 of the dump box 100. The second actuating link 14 pivots out from the side wall 102 of the dump box 100 and pushes out the first actuation link 12, which causes the other end of the baffle 10 to move away from the side wall 102 of the dump box 100. When the dump box 100 is tilted, the baffle 10 will cause material in the dump box to be poured over a narrower width. However, the position of each baffle should be adjusted before material is placed in the dump box as would be true for a manually actuated baffle.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An automatic actuating baffle system for a dump box, comprising:
    a baffle having one end pivotally attached to a side wall of the dump box;
    an actuation device having an actuating end and a nonactuating end, said nonactuating end being pivotally attached to the side wall;
    a first actuating link having one end pivotally attached to the other end of said baffle; and
    a second actuating link having one end pivotally attached to the other end of said first actuating link, the other end of said second actuating link being pivotally attached to the side wall of the dump box, said second actuating link being driven by said actuating end.

2. The automatic actuating baffle system for a dump box of claim 1, further comprising:
    one end of a drive link being rigidly attached to the other end of said second actuating link, the other end of said drive link being pivotally retained by said actuating end.

3. The automatic actuating baffle system for a dump box of claim 2, further comprising:
    at least one pivot block being attached to the side wall of the dump box, the other end of each said second actuating link being rigidly attached to a pivot rod, said at least one pivot block pivotally retaining said pivot rod.

4. The automatic actuating baffle system for a dump box of claim 1, further comprising:
    a hinge plate being pivotally attached to the one end of said baffle, said hinge plate being rigidly attached to the side wall of the dump box.

5. The automatic actuating baffle system for a dump box of claim 1, further comprising:
    an actuating pivot block being attached to the side wall, said nonactuating end of said actuating device being pivotally retained by said actuating pivot block.

6. The automatic actuating baffle system for a dump box of claim 1 wherein:
    said actuating device being an air cylinder.

7. An automatic actuating baffle system in combination with a dump box comprising:
    the baffle having one end pivotally attached to a side wall of the dump box;
    an actuation device having an actuating end and a nonactuating end, said nonactuating end being pivotally attached to the side wall;
    a first actuating link having one end pivotally attached to the other end of said baffle;
    a second actuating link having one end pivotally attached to the other end of said first actuating link, the other end of said second actuating link being pivotally attached to the side wall of the dump box; and
    one end of a drive link being rigidly attached to the other end of said second actuating link, the other end of said drive link being pivotally retained by said actuating end.

8. The automatic actuating baffle system in combination with a dump box of claim 7, further comprising:
    at least one pivot block being attached to the side wall of the dump box, the other end of each said second actuating link being rigidly attached to a pivot rod, said at least one pivot block pivotally retaining said pivot rod.

9. The automatic actuating baffle system for a dump box of claim 7, further comprising:
    a hinge plate being pivotally attached to the one end of said baffle, said hinge plate being rigidly attached to the side wall of the dump box.

10. The automatic actuating baffle system for a dump box of claim 7, further comprising:
    an actuating pivot block being attached to the side wall, said nonactuating end of said actuating device being pivotally retained by said actuating pivot block.

11. The automatic actuating baffle system for a dump box of claim 7 wherein:
    said actuating device being an air cylinder.

12. A method of decreasing a width of material poured out of a dump box comprising the steps of:
    pivoting one end of a baffle relative to a first side wall of said dump box;
    connecting pivotally a first actuating link to the other end of said baffle;
    connecting pivotally one end of a second actuating link to the other end of said first actuating link; and pivoting said second actuating link with an actuation device.

13. The method of decreasing a width of material poured out of a dump box of claim 12, further comprising the step of:

pivoting a second baffle on a side wall opposite said first side wall, said second baffle being actuated by a second actuation device.

14. The method of decreasing a width of material poured out of a dump box of claim 12, further comprising the step of:

attaching rigidly one end of a drive link to the other end of said second actuating link, the other end of said drive link being pivotally retained by an actuating end of said actuation device.

15. The method of decreasing a width of material poured out of a dump box of claim 12, further comprising the step of:

attaching at least one pivot block to the first side wall of the dump box, the other end of said second actuating link being rigidly attached to a pivot rod, said at least one pivot block pivotally retaining said pivot rod.

16. The method of decreasing a width of material poured out of a dump box of claim 12, further comprising the step of:

pivotally attaching a hinge plate to the one end of said baffle, said hinge plate being rigidly attached to the first side wall of the dump box.

17. The method of decreasing a width of material poured out of a dump box of claim 12, further comprising the step of:

attaching an actuating pivot block to the first side wall, a nonactuating end of said actuating device being pivotally retained by said actuating pivot block.

* * * * *